United States Patent
Paul et al.

(10) Patent No.: US 9,946,975 B2
(45) Date of Patent: Apr. 17, 2018

(54) METHOD AND APPARATUS TO IDENTIFY INFLUENCERS

(75) Inventors: Deirdre Paul, Madison, NJ (US); Christopher Volinsky, Morristown, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 2149 days.

(21) Appl. No.: 12/195,246

(22) Filed: Aug. 20, 2008

(65) Prior Publication Data
US 2009/0063254 A1    Mar. 5, 2009

Related U.S. Application Data

(60) Provisional application No. 60/957,818, filed on Aug. 24, 2007.

(51) Int. Cl.
G06Q 50/00 (2012.01)
G06Q 10/00 (2012.01)
G06Q 30/02 (2012.01)

(52) U.S. Cl.
CPC ......... *G06Q 10/00* (2013.01); *G06Q 30/0201* (2013.01); *G06Q 30/0204* (2013.01)

(58) Field of Classification Search
CPC ............... G06Q 30/02; G06Q 30/0201; G06Q 30/0251; G06Q 30/0269; G06Q 50/01; G06Q 50/24; G06F 17/30206
See application file for complete search history.

(56) References Cited

U.S. PATENT DOCUMENTS

| | | | |
|---|---|---|---|
| 2006/0143081 A1* | 6/2006 | Argaiz | 705/14 |
| 2007/0260599 A1* | 11/2007 | McGuire et al. | 707/5 |
| 2008/0070209 A1* | 3/2008 | Zhuang | G06Q 10/10 434/236 |

OTHER PUBLICATIONS

Trusov, M.; et al.; Your Members Are Also Your Customers: Marketing for Internet Social Networks; Sep. 29, 2006; pp. 1-40.*

* cited by examiner

*Primary Examiner* — Matthew S Gart
*Assistant Examiner* — Ashley Y Young

(57) ABSTRACT

A method and apparatus for identifying influencers are disclosed. For example, the method obtains a list of customers, and determines a social network for each of the customers. The method selects one or more attributes to be used for predicting a measure of influence for each of the customers, and determines one or more influencers in the social network by using the one or more attributes.

8 Claims, 4 Drawing Sheets

METHOD AND APPARATUS TO IDENTIFY INFLUENCERS

This application claims the benefit of U.S. Provisional Application No. 60/957,818 filed on Aug. 24, 2007, which is herein incorporated by reference.

The present invention relates generally to marketing and, more particularly, to a method for identifying one or more influencers within a social network.

BACKGROUND OF THE INVENTION

Network-based marketing refers to a collection of marketing techniques which take advantage of links between consumers to increase sales. More specifically, the ability to identify "influencers", e.g., those individuals who are influential in affecting how others purchase products and/or services is very important for marketing. For example, a network-based marketing technique may attempt to direct marketing efforts towards individuals in the hope that these individuals will in turn influence others within their social network. However, it is very difficult to identify the individuals within each social network as the influencers of the social network.

SUMMARY OF THE INVENTION

In one embodiment, the present invention discloses a method and apparatus for identifying influencers. For example, the method obtains a list of customers, and determines a social network for each of the customers. The method selects one or more attributes to be used for predicting a measure of influence for each of the customers, and determines one or more influencers in the social network by using the one or more attributes.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
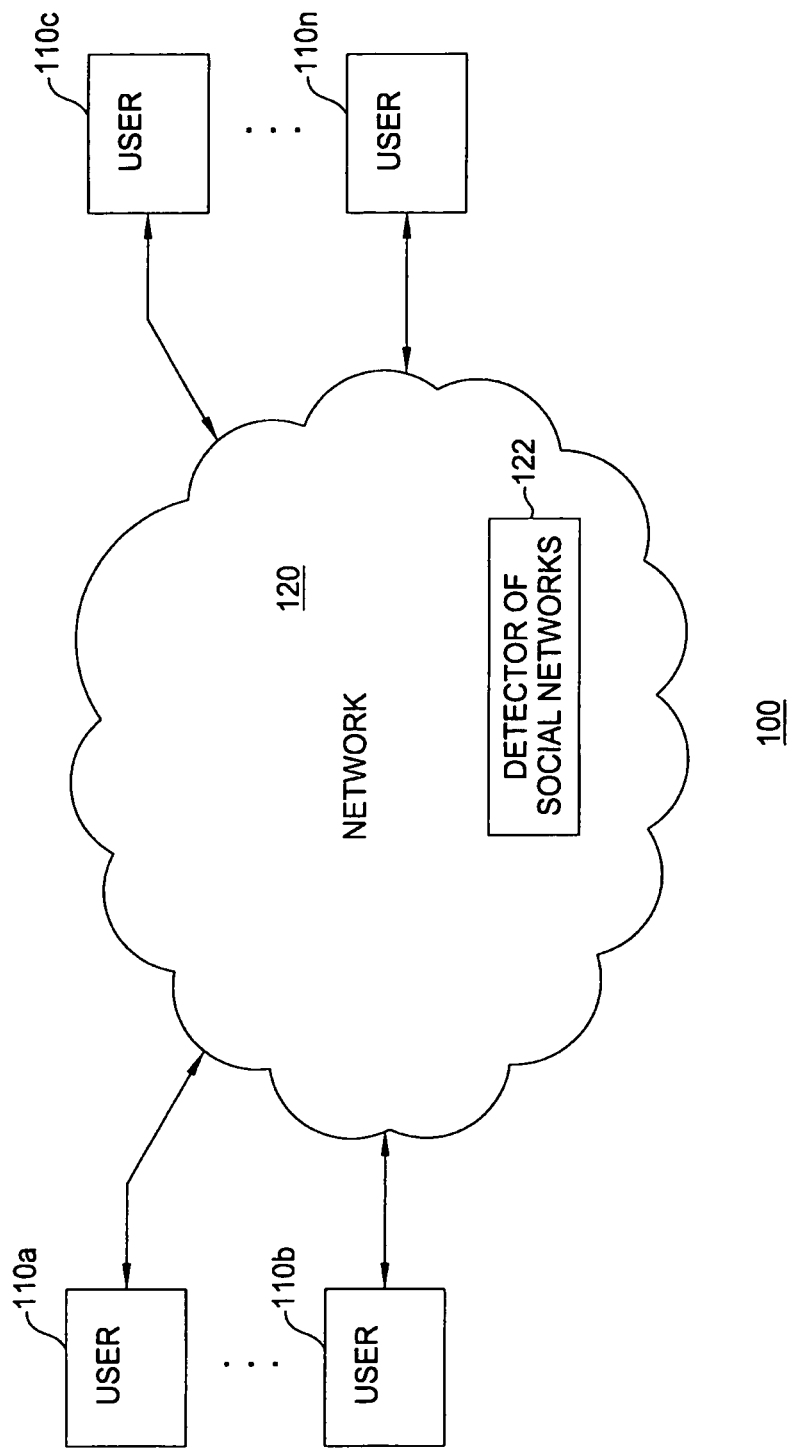
FIG. 1 illustrates an exemplary network related to the present invention.

Network-based marketing seeks to increase brand recognition and profit by taking advantage of a social network among consumers. Instances of network-based marketing have been called word-of-mouth marketing, diffusion of innovation, buzz marketing, and viral marketing. Note that multi-level marketing, which has become known as "network" marketing, is not considered to be network-based marketing. Awareness or adoption in network-based marketing spreads from consumer to consumer. For example, friends or acquaintances may tell each other about a product or service, increasing awareness and possibly exercising explicit advocacy. Firms may use their websites to facilitate consumer-to-consumer advocacy via product recommendations or via online customer feedback mechanisms. Consumer networks may also provide leverage to the advertising or marketing strategy of the firm. For example, there are three, possibly complementary, modes of network-based marketing: explicit advocacy, implicit advocacy, and network targeting, as described below.

Explicit advocacy refers to a mode wherein individuals become vocal advocates for a product or service, e.g., recommending the product or service to their friends or acquaintances. For example, individuals such as Oprah Winfrey, with her monthly book club reading list, may represent "hubs" of advocacy in the consumer relationship network. In another example, the success of the book "The Da Vinci Code," by Dan Brown, may be due to its initial marketing to influential readers; ten thousand books were initially delivered free to readers thought to be influential enough (e.g., readers, booksellers) to stimulate the traffic in paid-for editions. When firms give explicit incentives to consumers to spread information about a product via word of mouth, it has been called viral marketing, although that term could be used to describe any network-based marketing where the pattern of awareness or adoption spreads from consumer to consumer.

Implicit advocacy refers to a mode wherein individuals may not speak of a product or service, but may advocate implicitly through their actions, e.g., through their own adoption of the product. Designer labeling has a long tradition of using consumers as implicit advocates. Firms commonly capitalize on influential individuals (such as athletes) to advocate products simply by conspicuous adoption. More recently, firms have tried to induce the same effect by convincing particularly "influential" members of smaller social groups to adopt products.

Network targeting refers to a mode of network-based marketing wherein a firm may market a product or service to a prior purchaser's social-network neighbors, possibly without any advocacy at all by customers. For network targeting, the firm must have some means of identifying these social-network neighbors.

Network-based marketing is more profitable than traditional marketing, not only because targeting costs can be low, but also because adoption rates are higher. In addition, traditional marketing methods do not appeal to some segments of consumers. For various reasons, some consumers may value the appearance of being on the cutting edge or "in the know," and therefore derive satisfaction from promoting new, exciting products.

However, in order to increase the effectiveness of network-based marketing, it would be very beneficial to be able to identify one or more influencers within a social network. Namely, since influencers are individuals who are influential in affecting how others purchase products and/or services, directing marketing resources towards these influencers is more likely to produce the greatest returns.

FIG. 1 illustrates an exemplary communication network 100 related to the present invention. In one embodiment, a plurality of individuals or users $110_{a-n}$ are communicating with each other via a communication network 120. It should be noted that communication network 120 is not limited to a particular type of network. For example, communication network 120 may be implemented as a public network (e.g., the Internet) or a private network (e.g., a local area network). For example, the communication network 120 may broadly comprise: a packet network, a circuit-based network, a cellular or wireless network, an access network, a Voice over Internet Protocol (VoIP) network, and the like. In turn, the users $110_{a-n}$ may utilize any number of endpoint devices to communicate with each other, e.g., a telephone, a VoIP telephone, a cellular telephone, a pager, a computer, a laptop, a PDA, a communication device with video capability or any other known communication devices.

In one embodiment, a service provider may provide communication services via the network 120, e.g., a core network service provider, a cellular network service provider, an access network service provider, a local telephone network service provider, a cable network service provider and the like. In one embodiment, the service provider may employ a detector of social networks module or server 122 (e.g., an application server). Broadly defined, the detector of social networks module or server 122 is capable of defining a social network for a user, wherein the user is a customer of the service provider.

For example, for each identified user, e.g., a customer obtained from a customer list, one can define the identified user's social network. Broadly, a customer's social network can be defined as a group of users who exchange communications with the customer. In one embodiment, the group of users identified as being within the customer's social network is premised upon one or more attributes of the communications with the customer. For example, attributes of the communication may be: the type of communication (e.g., land line telephone calls, cell phone calls, instant messages, paging, emails, face to face communication, teleconference communication, video conference communication, and the like), the length of time of the communication, the frequency of the communication (several times per day, once per day, several times per week, several times per month and so on), the geography or location of the group of users, the type of services used in the communication, time of day and day of week, and the like.

Furthermore, module or server 122 may also identify one or more influencers within each social network as discussed below. In turn, module or server 122 may also implement one or more marketing strategies directed towards the one or more influencers within each social network as discussed below.

Figure 2:
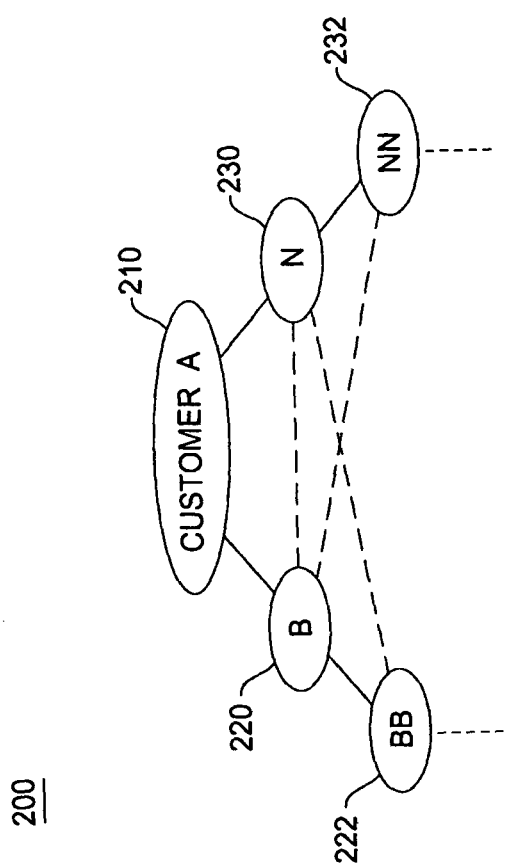
FIG. 2 illustrates an exemplary social network.

FIG. 2 illustrates an exemplary social network 200 for a customer 210. For example, customer A 210 may be identified as a customer of a service provider. Since the service provider is providing one or more communication services to the customer A, the service provider is capable of detecting customer A' communications (outbound or inbound) with other individuals, e.g., individual B 220 and individual N 230. In turn, the service provider may also detect individual B's communication with individual BB 222 and individual N's communication with individual NN 232 and so on. In one embodiment, the service provider may use any number of communication attributes to define a social network 200 for each customer 210 on a customer list.

In one embodiment, the method quantifies a measure of influence Y for a given customer, e.g., customer C. In one embodiment, the measure may be an inherent notion of how effective customer C is in influencing members or individuals within his/her social network. In one embodiment, the measure may be a measure of influence by customer C for a specific product or service. In one embodiment, the measure of influence may be based on whether or not the customer has explicitly designated an intent-to-recommend a product or service, e.g., as indicated by responses made by customer C in responding to a survey. The measure of influence Y may be a dichotomous, categorical, or continuous variable. For example, if the measure of influence is measured on an interval or ratio scale, it is a continuous variable. If the measure has a predefined set of categories, the measure is categorical. If the measure has two outcomes, e.g. yes or no on a survey, the measure is dichotomous.

In one embodiment, the current method uses information from the customer's social network. The method first defines the social network for customer C, SN(C), from the customer's communications data. In one embodiment, SN(C) is created from the communication's data obtained from a database.

For example, a database may contain a record of the customer's connectivity over various methods of communication. For example, the customer might communicate via telephones, instant message networks, online forums, email, etc. Various types of records, e.g., call detail records, email records, etc. might be gathered.

The method may then define a neighborhood N(C) for customer C, as a set of all other entities $N\_1, N\_2, \ldots, N\_m$ that have communicated with C during a predetermined time period. For example, if customer C communicated with 10 other users over a measurement period of 1-hour, the neighborhood for customer C for the hour contains the 10 other users.

The method then determines the strength of the relationships with the members of the neighborhood N(C). In one embodiment, the method uses attributes associated with: the members of the neighborhood N(C) and/or communications among members of N(C), to determine the strength of the relationships. For example, attributes associated with neighborhoods may specify customer status, tenure, a residential or business line, and the like. Attributes associated with communication among members may specify: type of communication (e.g. instant message, email, etc.), duration of communication (e.g. minutes), number of communication attempts (frequency of communication), and so on.

The method sorts N(C) by the strength of the relationships. For example, the method may truncate N(C) by selecting only the top k most important neighbors of C. For the example above, the method may truncate N(C) from 10 to 3 by selecting the top 3 most important neighbors of C.

The method may then recursively finds the neighborhoods for each of the remaining entities in N(C). For the example above, the method may recursively find the neighborhood for each of the top 3 most important neighbors of C. In one embodiment, the method is performed recursively n more times, e.g., three times, four times, and so on. Practically, relationships with a particular customer from more than two hops away are significantly weaker and may be considered as added noise.

The SN(C) then comprises the neighborhood N(C) and the recursively determined neighborhoods or each of the entities in N(C). For the example, above, if the top-3 most important neighbors are selected at each recursion, the social network SN(C) for the customer may have 3 members from one hop away and 9 members from 2 hops away.

Once SN(C) is defined for a customer, the method then selects attributes $X\_1, X\_2, \ldots, X\_p$ to be used for predicting the measure of influence Y. For example, the method may select attributes for the entities and the edges of the network neighborhood SN(C) that may be used for predicting Y. Since the prediction of influence is ultimately at the customer level, the method derives customer-level variables from the selected attributes. An illustrative but not an exhaustive list of variables that may be considered as predictors is as follows:

Usage for each product or service;
Account history for each product or service;
Customer care history; and
Demographics.

Usage for a product or service may provide a large volume of data. For example, data associated usage for a product or service can be analyzed to deduce the usage of a service, e.g., a communication service (e.g., measured in durations such as minutes and so on). The usage for a product or service may be further categorized by the type of usage (e.g., direct dial, calling card, international, roaming, instant message, email, uploading/downloading, etc.), outbound versus inbound, business versus residential, time of day, number of recipients (e.g. multiple recipients of email), absolute and relative amount of messages to the top few contacts (e.g. buddies, colleagues, etc.), feature usage, and so on.

Account history for each product or service may provide historical product subscription events, e.g., begin and/or end events, promotional offers received and/or accepted, discount plan, bill payment history (e.g., amount due, delinquency events, etc.), credit class history, loyalty program membership, and so on.

Customer care history may provide the history of call to customer care that may be further categorized by reason for call and/or resolution. For example, call may be for repair or technical support, to request a credit. A resolution may have included issuing a credit, performing maintenance, etc.

Demographics may provide household level and/or local area (e.g. census-block) level summary variables. For example, local area level information may provide geographical categories (e.g., urban, suburban or rural), municipality, etc. The geographical information may include product or service availability, competitive footprint, etc. In one embodiment, the demographics may also include income range, ages of household members, household size, highest education level, employment information, asset value (e.g., home value, car value), dwelling type (e.g., apartment, single family house, etc.), race/ethnicity, marital status, credit scores, etc.

Once the customer level variables are derived, the method performs an analysis of the relationships between the variables and Y to produce a list of variables $X\_1, \ldots, X\_p$ that predict Y. For example, variables $X\_1, \ldots, X\_p$ are found to be predictive. Other variables are found to be non-predictive and are not to be used for predicting Y. For example, whether or not a user has an influence may depend on his/her profession. For example, a famous athlete may have great influence for exercise related products and services but may have no influence for telephony related products and services.

The method then builds a model for predicting the measure of influence Y from SN(C) and the attributes $X\_1, X\_2, \ldots, X\_p$. For example, the method fits a model on the variables $X\_1, \ldots, X\_p$ to predict Y. In one embodiment, the model is a statistical model such as a linear regression, logistic regression, classification tree, neural network, or other predictive model. The type of model depends on the nature of the variables (e.g., dichotomous, categorical or continuous), the type of data, the ease of testing, interpretation, and implementation, and analyst preference.

In one embodiment, the method may also build models on interactions in a social network, transformations (e.g., logs, power terms, etc.), ratios, linear combinations, trends, etc. For example, the model that best fits the data may be a model that first determines transformations of several variables and then fits a model such as a linear regression model.

The method then identifies one or more influencers in a social network by applying the above method for predicting the measure of influence Y. For example, the method may identify a customer with a recent successful customer care experience as an influencer of product purchase among social contacts.

The method then provides one or more actions that may be taken based on the predicted value of the measure of influence Y. For example, an action may be to direct marketing information towards a group of users, who are deemed to be influencers within their social network. Examples that show how the methodology can be used for direct or mass marketing, design, and/or strategic planning are provided below.

In one example, a direct marketing may be performed targeting influencers to encourage their influence behavior. For example, incentives may be provided for referrals (e.g., for influencer and/or influenced), invitations may be extended for memberships and events, and information of interest may by provided.

In one embodiment, the method may target the social networks of likely influencers with materials and messages designed to facilitate the recommendation and influence process. For example, the method may provide priority queueing to the social networks of likely influencers. In addition to the above approaches to encourage influencer's behavior, the method may perform customized actions. For example, the method may send "Ask friend X about a specific product Y" message providing special incentives.

In one embodiment, the method includes influencers and their social networks in direct marketing campaigns when they might otherwise have been excluded. For example, a regular marketing campaign may have excluded a geographical area, e.g., may exclude areas below a specific population density, etc. The method may then include influencers and their social networks in the direct marketing effort despite a low population density.

In one embodiment, the method rewards customers based on the behavior of their social networks. For example, if a customer provides enough information about a product or service in influencing efforts, the members of the social network may be more influenced, e.g., may buy a product or service. In response, if the participation by the members of a particular social network is relatively high, then the influencers and/or all members of the social network will be given an additional reward, e.g., free services, free functionalities for a service, more minutes for a communication service, more reward points, and so on.

In one example, the method incorporates insights about influence behavior and characteristics of influencers when creating a mass marketing message or campaign. For example, certain features may be designed to enhance an influencer's effect, such as making features more noticeable, designing companion offers, and the like. For example, informing a customer that he or she has been deemed an "influencer", and as such, is provided with special privileges, e.g., given access to a preview, given access to a service on a trial basis before the service is available to the general public, and so on. This approach enhances the influencer's effect, because the influencer is deemed to be special and "in the know."

In one example, the method provides a strategy for a product or service by targeting influencers and their associated networks. For example, at various touch points, e.g., a customer care inquiry or a website visit, the method may ascertain and record the customer's intention to recommend (or proxy). The method may then use the recorded customer data to target valuable influencers and their associated networks, and to continually update the identification algorithm. In one embodiment, the method receives permission from the customer prior to using the recorded customer data. For example, when a customer contacts a customer care center, the customer can be asked whether the customer is willing to serve as an evaluator of a new service and whether the customer is willing to recommend the new service if the customer has a positive review of the new service, and so on.

In one example, the method may plan a strategy for a product or service using the knowledge of the strength of the relationships between members of a social network. For example, the method may plan marketing strategy using knowledge of absolute and relative time spent by members communicating in a social network. For example, the method may prioritize within a social network and/or among various social networks as to who will receive marketing material or marketing offers first. For example, social networks having members who communicate on a daily basis will have a higher priority than social networks having members who communicate several times on a monthly basis.

In one example, the method plans a strategy for a product or service by incorporating social network behavior into calculations of marketing effectiveness. For example, the method may determine correlation between influence behavior and product/service subscription. The method may then generate a higher rate of return compared to marketing efforts that do not accurately assess social network impact.

Figure 3:
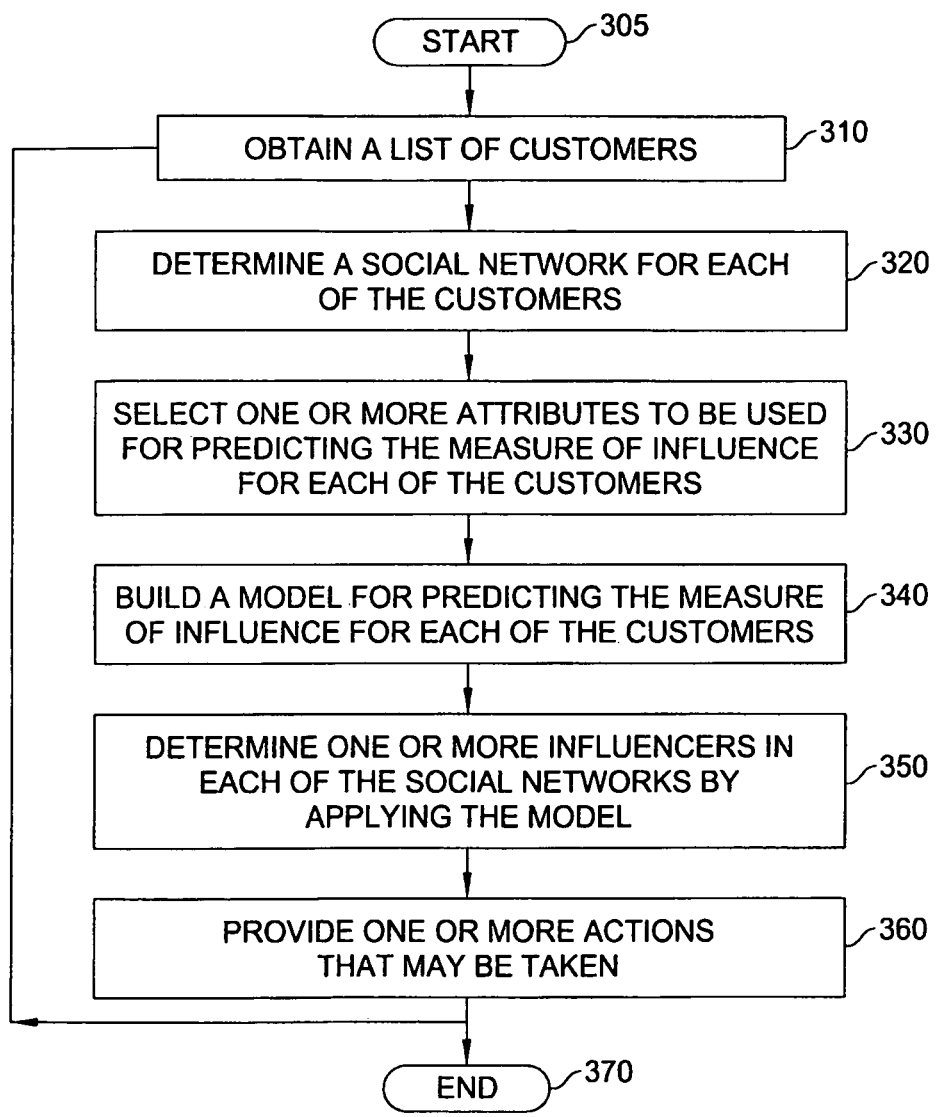
FIG. 3 illustrates a flowchart of a method for identifying influencers in accordance with one embodiment of the present invention.

FIG. 3 illustrates a flowchart of a method 300 for identifying influencers in accordance with one embodiment of the present invention. For example, one or more steps of method 300 can be implemented by the module or server 122. Method 300 starts in step 305 and proceeds to step 310.

In step 310, method 300 obtains a list of customers. For example, a service provider may obtain a list of all of its customers or the list may only pertain to a subset of customers who have subscribed to a particular service. In one embodiment, the service provider may have a database that contains a record of the customers' connectivity over various methods of communication. For example, a customer may communicate with other individuals via a land line telephone, a cellular telephone, an instant message network, an online forum, an email, etc. Various types of records, e.g., call detail records, email records, etc. can then be obtained or accessed.

In step 320, method 300 determines a social network for each of the customers. For example, any number of communication attributes (e.g., as discussed above) can be used to define the social network for the customer.

In step 330, method 300 selects one or more attributes to be used for predicting the measure of influence for each of the customers. For example, an attribute may be willingness of the customer to influence others, the customer having a high number of outbound calls to members of its social network, the customer's willingness to adopt new services, the customer's loyalty to a product or service, and so on.

In step 340, method 300 may build or implement a model for predicting the measure of influence for each of the customers. More broadly, method 300 applies the selected one or more attributes to determine one or more influencers. For example, the method may build a model from the social network of the customer and the selected attributes in step 330.

In step 350, method 300 determines one or more influencers in each of the social networks by applying the model for predicting the measure of influence for each of the customers. For example, the method may identify one or more influencers in a social network by applying the above method for predicting the measure of influence for each of the customers.

It should be noted that any number of parameters can be considered. Furthermore, it should be noted that influencers may embody "positive" influencers (individuals who influences others positively towards a product or service) and "negative" influencers (individuals who influences others negatively towards a product or service).

For example, in one embodiment, a parameter associated with active user provided responses can be considered in determining whether an individual is likely to be an influencer. To illustrate, a survey may have been sent to the individual asking whether the individual is willing to recommend a product or service to a friend of the individual. If the individual provides a positive or negative response, then such response can be stored and evaluated in determining whether the individual is likely to be an influencer. It should be noted that the use of a survey is only illustrative in this embodiment. Any means that allow an individual to provide responses pertaining to intent-to-recommend or intent-not-to-recommend are contemplated and within the scope of the present invention.

In another embodiment, a parameter associated with a sequence of product/service adoption can be considered in determining whether an individual is likely to be an influencer. To illustrate, if an individual is monitored to have adopted a new service first, where subsequently, other individuals within the social network of the individual also adopt the new service, then such sequence of adoptions is considered in determining whether the individual is likely to be an influencer.

In another embodiment, a parameter associated with spending increase (or decrease) can be considered in determining whether an individual is likely to be an influencer. To illustrate, if an individual is monitored to have increased (or decreased) his spending for a particular service, where subsequently, other individuals within the social network of the individual also increase (or decrease) their spending for the same service, then such sequences of spending increase (or decrease) is considered in determining whether the individual is likely to be an influencer.

Returning to FIG. 3, in optional step 360, the method provides one or more actions that may be taken based on the predicted values of the measure of influence for each customer. For example, once the influencers are identified in step 350, marketing material may target indentified influencers in each social network. For example, promotional materials may be sent to the influencers, incentives may be directed to the influencers, upgraded or new products/services may be temporarily provided to the influencers for evaluation, and the like. Any number of marketing resources is contemplated by the present invention. The method then ends in step 370 or returns to step 310 to continue obtaining more data.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
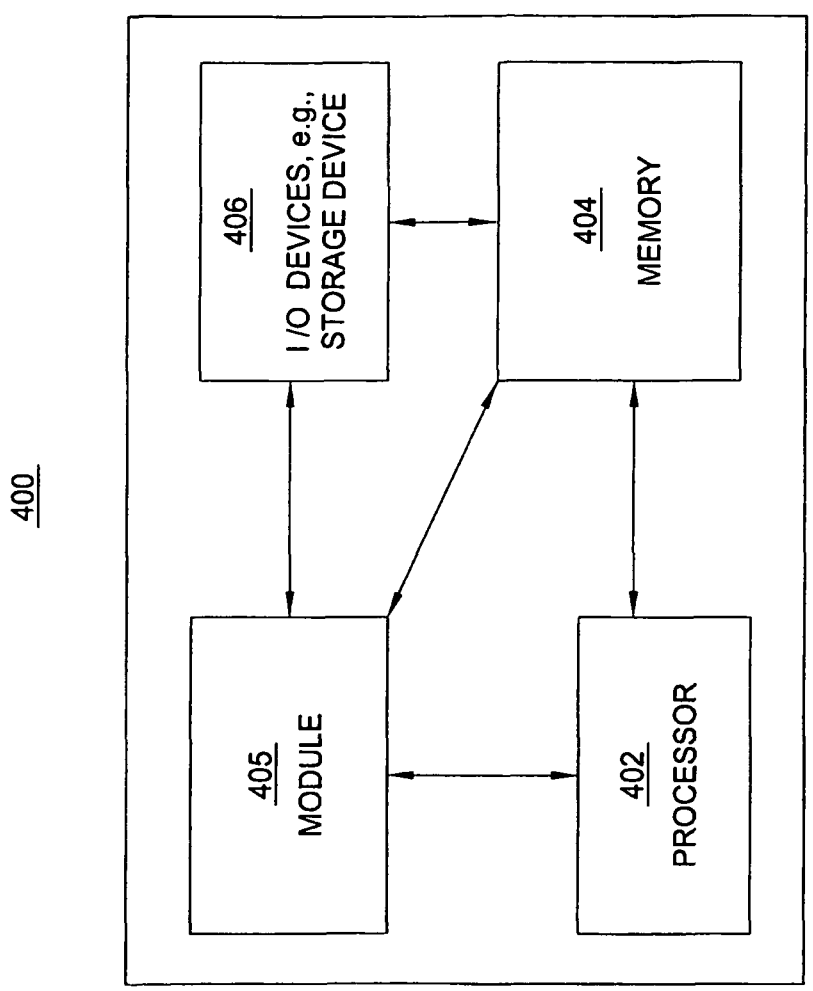
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for identifying influencers, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for identifying influencers can be loaded into memory 404 and executed by processor 402 to implement the functions as discussed above. As such, the present method 405 for identifying influencers (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for identifying an influencer, comprising:
   determining, via a processor, a social network for each of a plurality of customers based upon a group of users who have exchanged communications with each of the plurality of customers, wherein the determining the social network for each of the plurality of customers comprises:
      defining a neighborhood for each of the plurality of customers; and
      determining a strength of relationships of each of the plurality of customers with members of the neighborhood of the customer;
      truncating the neighborhood for each of the plurality of customers by selecting k neighbors of each of the plurality of customers, wherein the k is a predetermined integer; wherein the truncating the neighborhood is performed by selecting a most important k neighbors using the strength of relationships;
      recursively finding a respective neighborhood for each of the remaining members in the neighborhood for a pre-determined number of times; and
      defining the social network for each of the plurality of customers as the neighborhood that comprises the truncated neighborhood of the customer and the respective neighborhood that is recursively found;
   selecting, via the processor, an attribute associated with communications among the plurality of customers to be used for predicting a measure of influence for each of the plurality of customers, wherein the attribute comprises a willingness of a customer to adopt new services;
   building, via the processor, a model based upon the attribute associated with the communications among the plurality of customers that is selected, the social network of each of the plurality of customers and a sequence of product adoption events of each of the plurality of customers for predicting the measure of influence for each of the plurality of customers, wherein the model comprises a statistical model, wherein the statistical model comprises a linear regression model, wherein the sequence of product adoption events includes each of the plurality of customers first adopting a new service and subsequently users in the group of users who have exchanged communications with each of the plurality of customers also adopting the new service; and
   determining, via the processor, the influencer in the social network by applying the model.

2. The method of claim 1, further comprising:
   providing an action to be taken for the influencer.

3. The method of claim 2, wherein the action comprises a directing marketing action.

4. A non-transitory computer-readable medium storing instructions which, when executed by a processor, cause the processor to perform operations for identifying an influencer, the operations comprising:
   determining a social network for each of a plurality of customers based upon a group of users who have exchanged communications with each of the plurality of customers, wherein the determining the social network for each of the plurality of customers comprises:
      defining a neighborhood for each of the plurality of customers; and
      determining a strength of relationships of each of the plurality of customers with members of the neighborhood of the customer;
      truncating the neighborhood for each of the plurality of customers by selecting k neighbors of each of the plurality of customers, wherein the k is a predetermined integer; wherein the truncating the neighborhood is performed by selecting a most important k neighbors using the strength of relationships;
      recursively finding a respective neighborhood for each of the remaining members in the neighborhood for a pre-determined number of times; and
      defining the social network for each of the plurality of customers as the neighborhood that comprises the truncated neighborhood of the customer and the respective neighborhood that is recursively found;
   selecting an attribute associated with communications among the plurality of customers to be used for predicting a measure of influence for each of the plurality of customers, wherein the attribute comprises a willingness of a customer to adopt new services;
   building a model based upon the attribute associated with the communications among the plurality of customers that is selected, the social network of each of the plurality of customers and a sequence of product adoption events of each of the plurality of customers for predicting the measure of influence for each of the plurality of customers, wherein the model comprises a statistical model, wherein the statistical model comprises a linear regression model, wherein the sequence of product adoption events includes each of the plurality of customers first adopting a new service and subsequently users in the group of users who have exchanged communications with each of the plurality of customers also adopting the new service; and
   determining the influencer in the social network by applying the model.

5. The non-transitory computer-readable medium of claim 4, wherein the operations further comprise:
providing an action to be taken for the influencer.

6. The non-transitory computer-readable medium of claim 5, wherein the action comprises a directing marketing action.

7. An apparatus for identifying an influencer, comprising:
a processor; and
a computer-readable medium storing instructions which, when executed by the processor, cause the processor to perform operations, the operations comprising:
determining a social network for each of a plurality of customers based upon a group of users who have exchanged communications with each of the plurality of customers, wherein the determining the social network for each of the plurality of customers comprises:
defining a neighborhood for each of the plurality of customers; and
determining a strength of relationships of each of the plurality of customers with members of the neighborhood of the customer;
truncating the neighborhood for each of the plurality of customers by selecting k neighbors of each of the plurality of customers, wherein the k is a predetermined integer; wherein the truncating the neighborhood is performed by selecting a most important k neighbors using the strength of relationships;
recursively finding a respective neighborhood for each of the remaining members in the neighborhood for a pre-determined number of times; and
defining the social network for each of the plurality of customers as the neighborhood that comprises the truncated neighborhood of the customer and the respective neighborhood that is recursively found;
selecting an attribute associated with communications among the plurality of customers to be used for predicting a measure of influence for each of the plurality of customers, wherein the attribute comprises a willingness of a customer to adopt new services;
building a model based upon the attribute associated with the communications among the plurality of customers that is selected, the social network of each of the plurality of customers and a sequence of product adoption events of each of the plurality of customers for predicting the measure of influence for each of the plurality of customers, wherein the model comprises a statistical model, wherein the statistical model comprises a linear regression model, wherein the sequence of product adoption events includes each of the plurality of customers first adopting a new service and subsequently users in the group of users who have exchanged communications with each of the plurality of customers also adopting the new service; and
determining the influencer in the social network by applying the model.

8. The apparatus of claim 7, wherein the operations further comprise:
providing an action to be taken for the influencer.

* * * * *